Patented Sept. 12, 1944

2,358,235

UNITED STATES PATENT OFFICE 2,358,235

HYDROGENATION OF ROSIN COMPOUNDS

Wilbur A. Lazier, New Castle County, Del., assignor to E. I. du Pont de Nemours & Company, Wilmington, Del., a corporation of Delaware No Drawing. Application March 13, 1935, Serial No. 10,794

12 Claims. (Cl. 260—100)

This invention relates to catalytic hydrogenation processes and more particularly to improved processes for the catalytic reduction of rosin and its derivatives. Specifically, the invention relates to the application of valuable chromite catalysts to the hydrogenation of rosin and rosin compounds and to special technique for the preparation of abietyl alcohols.

This case is a continuation-in-part of my following copending applications: Serial No. 445,224 filed April 17, 1930, Serial No. 456,298 filed May 27, 1930, Serial No. 520,473 filed March 5, 1931, Serial No. 584,573 filed January 2, 1932, Serial No. 629,754 filed August 20, 1932, Serial No. 715,509 filed March 14, 1934, and Serial No. 739,417 filed August 11, 1934.

Rosin consists essentially of abietic acid, a derivative of a partially saturated alkyl-substituted phenanthrene. Abietic acid is known to contain one carboxyl group and two olefinic double bonds. Hence, it is capable of absorbing one hydrogen molecule to form a dihydroabietic acid, and a second molecule of hydrogen to form the tetrahydroabietic acid in which the carbon-to-carbon valences are fully satisfied. There remains, however, an unsaturated carbon-to-oxygen bond in the carboxyl group which may, according to procedures outlined in this invention, be replaced with hydrogen in order to transform the carboxyl group to a carbinol group with the formation of tetrahydroabietyl alcohol. If this reaction is not complete, a portion of the alcohol formed may react with the remaining tetrahydroabietic acid to form an ester (tetrahydroabietyl tetrahydroabietate). A still more exhaustive hydrogenation may convert a hydroabietyl alcohol to a hydroabietane with the complete removal of oxygen. As might be expected, these various steps in the progressive hydrogenation of abietic acid take place with varying degrees of difficulty. Thus, it is much less of a problem to convert abietic acid and its esters into the dihydro derivatives than to force the reaction to the tetrahydro stage. In general, the carboxyl reduction requires still more drastic conditions which merge into those required for the most difficult step of complete removal of oxygen. It is conceivable that through a proper selection of catalysts the order of these steps might be altered so as to produce, for example, an unsaturated rosin alcohol or an unsaturated hydrocarbon. Furthermore, conditions and catalysts might be selected whereby two or more of the steps in the direction of the formation of completely hydrogenated material might be brought about simultaneously.

Crude rosin and the pure abietic and hydroabietic acids are capable of forming anhydrides with carboxylic acids, and esters with monohydric and polyhydric alcohols, and these anhydrides and esters are subject to the same progressive changes on catalytic hydrogenation as described above for rosin and the abietic acids themselves.

Various attempts have been made heretofore to carry out the partial or complete reduction of rosin and its derivatives. Applications of the well known vegetable oil hardening technique, wherein kieselguhr-supported copper and nickel catalysts are employed at temperatures in the vicinity of 180° to 225° C. and at pressures below 35 atmospheres have resulted in a partial reduction of the iodine number of the resin without affecting the acidic nature of the product through an attack on the carboxyl group. Abietyl alcohol has been obtained, however, through the carboxyl reduction of abietic acid esters with metallic sodium as the reducing agent. In so far as I am aware, no one has made advantageous use of highly active chromite catalysts in the hydrogenation of rosin, abietic acid, their esters or their anhydrides to any reduction products whatsoever prior to my discovery thereof. Furthermore, no one has heretofore disclosed or succeeded in carrying out a catalytic hydrogenation of a rosin compound in such a manner that an abietyl or hydroabietyl alcohol or ester is formed.

This invention accordingly has as an object to carry out the catalytic hydrogenation of rosin and rosin compounds, particularly esters of abietic acid, by the use of highly efficient chromite catalysts. A further object is to provide an improved process for the production of hydroabietic acids and their esters. A still further object is to provide a process for the hydrogenation of rosin, abietic acid, hydroabietic acids, their esters, and their anhydrides to the corresponding abietyl or hydroabietyl alcohols. A specific object is to hydrogenate an abietic acid ester to an abietyl alcohol by the use of a copper chromite catalyst.

These objects are accomplished by bringing a rosin compound into intimate contact with an excess of hydrogen at a suitably elevated temperature and pressure and in the presence of a highly active chromite catalyst. Depending upon the exact composition of the catalyst and the conditions selected, the hydrogen is absorbed by the rosin compound with the formation of one or more of the compounds of the group comprising dihydroabietic acid, tetrahydroabietic acid, abietyl alcohol, dihydroabietyl alcohol, tetrahydroabietyl alcohol, esters of the aforementioned compounds, abietene, dihydroabietene, and abietane.

The following examples are designed to indicate in greater detail how the invention may be applied in the production of a number of the products named.

Example 1

A highly active nickel chromite catalyst was prepared as follows: One thousand seven hundred and fifty grams of nickel nitrate was dissolved in three liters of water and mixed with a solution of 750 g. of ammonium bichromate in an equal volume of water. The mixed solution was heated to 90° to 100° C. for 30 minutes with stirring, after which the brick red precipitate formed was washed by decantation and dried. By analysis the dried product contained 6.7% ammonia and 26.6% nickel and consisted of a complex double chromate of ammonia and nickel. This compound was ignited at 400° C. to drive off the ammonia and part of the oxygen and then reduced for 12 hours in a stream of dry hydrogen at 500° C.

Fifteen grams of reduced nickel chromite catalyst prepared as described above was charged into a shaking autoclave together with 100 g. of crude abietic acid and 200 cc. of ethyl acetate. Hydrogenation was carried out with rapid agitation at a temperature of 170° C. and under a hydrogen pressure of about 1000 lbs. per sq. in. Hydrogen absorption was rapid during the first ten minutes and diminished slowly during the course of several hours. The total hydrogen absorption was 1.4 moles per mole of abietic acid, which conforms to the conversion of the acid to a mixture containing about equal parts of dihydroabietic acid and tetrahydroabietic acid. The hydrogenated product was isolated by filtering the solution to remove the catalyst and evaporating the solvent.

Similar results were obtained in a second run in which 95% ethyl alcohol was used as the solvent and the reaction was carried out at 200° C.

Example 2

A copper chromite catalyst was prepared as follows: Fifteen hundred grams of copper nitrate dissolved in 4 liters of water was mixed with a solution containing 1000 g. of ammonium chromate in an equal volume of water. Ammonium hydroxide was added to neutralize the acidity developed during precipitation of the copper ammonium chromate. The precipitate was washed by decantation, filtered, and dried, after which it was ignited at a temperature of 400° C. The resulting copper chromite powder was extracted with 10% acetic acid, washed, and dried.

In an alloy steel tube having a capacity of about 0.4 liter there was placed 192 g. of wood rosin and 16 g. of acid-extracted copper chromite catalyst prepared as described above. The tube was closed, secured in a suitable agitating device and connected with a supply of compressed hydrogen. The tube and contents were agitated rapidly and heated to a temperature of 200° C. At a pressure of about 100 lbs. per sq. in. hydrogen absorption took place over a period of about 5 hours. The fused hydrogenated rosin was filtered and analyzed. By the Hübl method of determining the unsaturation, the product had an iodine number of 96 as compared with 234 for the unhydrogenated material. The acid number was such as to indicate the substantial absence of carboxyl reduction under the conditions used.

By way of illustrating the advantage of using copper chromite instead of the copper catalysts of the prior art, a similar experiment was carried out in which 186 g. of wood rosin was hydrogenated for 5 hours with 15 g. of a catalyst prepared by precipitating copper carbonate on kieselguhr. The conditions of temperature and pressure were the same as before but the product had a Hübl iodine number of 112.

Example 3

The following procedure indicates a method to be used when the catalytic hydrogenation is to be carried beyond the stage of attack on the olefinic unsaturation only. At the higher temperatures used in the following example there is also a partial reduction of the carboxyl group with the formation of alcohols.

One hundred and sixty grams of ethyl abietate was hydrogenated at 260° C. and 3000 lbs. hydrogen pressure with the aid of 15 g. of copper chromite catalyst prepared as described in Example 2. After seven hours' treatment with agitation, the product was cooled, diluted with ether, and filtered. The resinous products were recovered by evaporation of the solvent and the residue examined by determination of the usual analytical constants. It was found to have a Hübl iodine number of about 50, indicating a substantial clean-up of the carbon-carbon double bonds. The hydroxyl value of the product was about 138, corresponding to about a 70% conversion of the rosin ester to the corresponding hydroabietyl alcohol.

Example 4

An autoclave is charged with 200 g. of hydroabietic acid, 100 g. of toluene, and 15 g. of a nickel-chromium oxide catalyst prepared by the reduction of nickel chromate with hydrogen at a temperature of 500° C. for a period of about 4 hours. The rosin mixture is hydrogenated at a temperature of 300° to 350° C. and under a hydrogen pressure of 100 to 300 atmospheres. The alcoholic and hydrocarbon derivatives are obtained by evaporation of the solvent.

Instead of hydroabietic acid equally good results may be obtained in the hydrogenation of ethyl abietate or glyceryl abietate otherwise known as ester gum.

Example 5

The procedure described in Example 1 was applied to ethyl abietate in order to convert it into a mixture of ethyl hydroabietates. Two hundred and fifty g. of this material was then charged into an autoclave together with 20 g. of copper chromite catalyst prepared as described in Example 2. The ethyl hydroabietate sample was hydrogenated for seven hours with agitation at a temperature of 260° C. and under a hydrogen pressure of about 3000 lbs. per sq. in. Considerable hydrogen was absorbed. The hydroabietyl alcohol product was recovered by dilution with a solvent followed by filtration and evaporation of the solvent. A determination of the saponification number before and after treatment indicated a conversion of the carbethoxy group to a carbinol group amounting to about 75%.

Example 6

Twenty-six grams of barium nitrate and 218 g. of cupric nitrate were dissolved in 0.8 liter of water by heating to 70° C. A solution of 126 g. of ammonium bichromate and 0.15 liter of 28% ammonium hydroxide in 600 cc. of water was added with stirring. The precipitate was filtered, dried and ignited at 400° C. The residue was then extracted twice with 10% acetic acid, washed and dried.

Twenty-one grams of copper-barium chromite prepared as described above and 212 g. of ethyl abietate were charged into a high-pressure autoclave. Hydrogenation was carried out with agitation at a temperature of 260° C. and under a hydrogen pressure of 3000 lbs. per sq. in. Absorption of hydrogen was fairly rapid at first and ceased altogether after about 5 hours. The product was cooled, diluted with 200 cc. of ether, and filtered. After evaporation of the solvent and the ethyl alcohol formed in the reaction, there remained a water-white viscous mass comprising essentially a mixture of hydroabietyl alcohols. The hydroxyl number of this material approximated the theoretical value for tetrahydroabietyl alcohol but the Hübl iodine number was about 38, indicating failure of the catalyst to saturate completely the olefin bonds.

The hydroabietyl alcohol product described above was subjected to a further hydrogenation with a nickel catalyst at a temperature of 200° C. and a pressure of 1800 lbs. per sq. in. This treatment resulted in complete saturation of the tetrahydroabietyl alcohol (iodine No. 4) without impairing the hydroxyl value, color, or viscosity characteristics of the product. Carbon and hydrogen determinations were in close agreement with the calculated values for tetrahydroabietyl alcohol.

Example 7

In a manner similar to that described in Example 6, methyl abietate was hydrogenated to a mixture of hydroabietyl alcohols by the use of the copper-barium chromite catalyst. With 200 g. of methyl abietate and 20 g. of catalyst the reaction time was 6 hours at the same temperatures and pressures used in Example 6. The product was taken up in alcohol, the catalyst removed, and the solvent evaporated off. Here again the color was good and the hydroxyl number indicated that the ester had been substantially completely converted to the corresponding alcohols. The iodine number of the product was about 40.

Example 8

Abietic acid was hydrogenated to a mixture of abietyl alcohols in the following manner: The autoclave was charged with 100 g. of abietic acid, 50 g. of dioxane, and 10 g. of copper-barium chromite catalyst prepared as described in Example 6. At 260° C. and 3000 lbs. pressure, hydrogenation proceeded much the same as in the case of the abietic acid esters. After four hours the product was recovered, filtered and evaporated. The product had an acid value of only 9 and the hydroxyl value corresponded closely to the theoretical value for an abietyl alcohol.

Similar rates of hydrogenation and properties of the product were obtained by using a good grade of wood rosin in place of the abietic acid. Alcohol was substituted for the dioxane solvent in one case and proved to be somewhat less satisfactory.

Under the conditions described in this example, 100 g. of ester gum was hydrogenated in dioxane with 10 g. of the copper-barium chromite catalyst. Hydrogenation was somewhat less rapid than in the case of abietic acid and its esters with monohydric alcohols. Analytical values on the product, however, indicated the same general change in the chemical characteristics of the product.

Another modification of the procedure used in this example consisted of hydrogenating rosin with the copper-barium chromite catalyst without the aid of a solvent. Under the same conditions as before, hydrogen absorption took place at a reduced rate, and the product was more highly colored than that obtained by use of a solvent.

Although the foregoing examples show in detail a number of modifications and variations in procedure that may be practiced in accordance with the present invention, it may not be readily apparent that certain factors such as temperature, pressure and catalyst composition control to a large extent the course and rate of the reaction and the nature of the products obtained. Among these factors temperature is perhaps the most important. The absorption of hydrogen by the abietic acid nucleus in order to form the dihydro derivative takes place in the temperature range 125° to 225° C., depending somewhat on the catalyst, for the process may be carried out at the lower end of the temperature range with nickel chromite catalyst and at the higher temperatures with copper chromite. In this temperature range, the hydrogenation of the dihydro compounds to the tetrahydro derivatives also takes place, but at an appreciably slower rate and much less completely. In the temperature range 125° to 225° C. there is little or no attack on the carboxyl group and the products therefore consist of one or both of the hydroabietic acids or their esters. If, however, hydrogenation is carried out at temperatures in the approximate range of 200° to 400° C., then a reduction of the carboxyl group to an alcohol group or a hydrocarbon group becomes prominent, depending upon the catalyst used, and may proceed simultaneously with or subsequently to the conversion of the unsaturated nucleus to the corresponding saturated nucleus. The preferred temperature range of the carboxyl reduction of rosin compounds to hydroabietyl alcohols is 250° to 350° C. when a copper containing catalyst is used.

Pressures in excess of atmospheric pressure are to be preferred in any type of hydrogenation of rosin compounds, but here again the critical importance of the pressure depends on the type of hydrogenation desired. The carboxyl hydrogenation in particular is favored by the use of elevated pressures which may range from about 10 atmospheres up to the limits of safety of the existing equipment. Ordinarily the pressures used will be in the range of 50 atmospheres to 400 atmospheres and seldom in excess of 750 atmospheres.

In connection with that part of the invention relating to the nuclear hydrogenation of the abietic acid molecule, the present invention is limited to the use of catalyst compositions comprising highly active chromites of base metals. However, the invention is much broader in scope as regards catalysts for use in the higher temperature range for the production of an abietyl alcohol. Whereas the critical factors in the hydrogenation of rosin compounds to abietyl alcohols are the use of high temperatures and pressures, it is necessary that suitable catalysts be selected from among a number of different hydrogenating metals and oxides. Mild hydrogenating catalysts such as metallic copper and zinc oxide which are well known to be suitable for the synthesis of methanol from carbon monoxide and hydrogen are in general also suitable catalysts for the production of alcohols from abietic acid compounds. On the other hand, there are certain very energetic catalysts such as metallic nickel, cobalt, and iron which are known to catalyze the formation of hydrocarbons from oxides of carbon and hydrogen. These ferrous metal catalysts, when employed in the hydrogenation of abietic acid and its esters to abietyl alcohols tend to carry the reaction too far with the formation of hydrocarbons. Therefore, if the hydrogenation is to be operated for the production of alcohols to the substantial exclusion of hydrocarbons, it is preferable to select as the catalyst a composition comprising a member of the group of non-ferrous hydrogenating metals such as copper, tin, silver, cadmium, zinc, lead, their oxides and chromites, and oxides of manganese and magnesium. Especially good results are obtained with finely divided copper oxide, either wholly or partially reduced and preferably supported upon an inert surface-extending material such as kieselguhr, or promoted by such oxide promoters as manganese oxide, zinc oxide, barium oxide, magnesium oxide, or chromium oxide. The above-mentioned mild-acting catalysts may be termed the alcohol-forming catalysts to distinguish them from the more energetic hydrocarbon-forming elements of the platinum and ferrous metal groups. Elementary nickel, cobalt, and iron when suitably supported on kieselguhr may be used to effect the reduction of rosin compounds with hydrogen, but if the temperature employed is sufficiently high to effect a reduction of the carboxyl group, the product contains besides alcohols a preponderance of hydrocarbons, and this disadvantage in most cases will prove so serious as to preclude the use of these catalysts unless the hydrocarbons themselves are the desired end products.

Catalysts suitable for use in the liquid phase batch method of hydrogenation are preferably prepared in a powder form and may be used in concentrations ranging from 1% to 15% of the weight of the rosin compound treated. In general, larger concentrations are used for the carboxyl reduction than for the hydrogenation of the olefin bond. The preferred catalyst is usually a copper (or nickel) chromite prepared by igniting a double copper (or nickel) ammonium chromate to its spontaneous decomposition temperature as described in U. S. Patent 1,964,000. Many modifications of this procedure have been practiced involving the use of acid extraction, hydrogen reduction, and the use of a supplementary support such as kieselguhr, but these are modifications in degree only. The essential feature is the use of copper (or nickel) oxide intimately associated or combined with chromium sesquioxide and the chromite method of preparation is a convenient method for effecting the desired association. The method, however, is not limited to copper but may be practiced in the preparation also of zinc chromite, silver chromite, manganese chromite, etc.

For use in the continuous flow method of hydrogenation which may be practiced in the case of the more volatile rosin compounds such as the esters with low molecular weight alcohols, certain metal oxides belonging to the class of difficultly reducible hydrogenating oxides may be conveniently employed on account of their rugged character and the ease with which they may be shaped into hard granules for loading into stationary apparatus. By the term "difficultly reducible" is meant that the oxides are not substantially reduced to metal by prolonged exposure in a state of purity to the action of hydrogen at atmospheric pressure and at a temperature of 400° to 450° C. Such oxides which may be suitable for use as catalysts in the hydrogenation of rosin compounds are zinc oxide, barium oxide, manganese oxide, and magnesium oxide. These oxides may be employed either alone or in combination with each other or with other metals or oxides which have a promoting action. Preferably the difficultly reducible hydrogenating oxides also are prepared in the form of chromites, as already indicated in the examples.

Owing to the very low volatility of rosin compounds the preferred method of hydrogenation involves processing of the material in a liquid state. This may take the form of a normally liquid derivative of abietic acid, or a melt of an undiluted resin; or the compound to be hydrogenated may be dissolved in a suitable solvent. A large number of solvents will be found suitable, including aromatic and naphthenic hydrocarbons, esters, alcohols, ethers, etc. The present invention also contemplates such modifications of the process as adaptation to continuous flow over the catalyst either in the form of a liquid film or diluted vapor of a suitably volatile rosin compound.

The present invention is applicable to abietic acid, crude or refined, and other acid resins containing unsaturation and/or carboxyl groups. Crude rosin may, for example, be hydrogenated directly. The preferred process consists in forming a neutral derivative such as an ester or anhydride by well-known methods and the hydrogenation of said neutral rosin compound. Suitable esters may be prepared from aliphatic, aromatic, or alicyclic monohydroxy compounds such as methyl, ethyl, propyl, butyl, or isobutyl alcohols and cyclohexanol, benzyl alcohol or a phenol. The esters may also be formed by use of a polyhydric alcohol such as glycerine or glycol.

From the foregoing account, it will be apparent that by the use of chromite catalysts I have effected substantial improvements in the art of preparing hydroabietic acid compounds. Not only are the new catalysts extremely active in the necessary hydrogenation reactions, but they are also capable of withstanding to a considerable degree such catalyst poisons as oxygen and sulfur. This is presumably because of the potential supply of unreduced hydrogenating metal which may be continuously activated under the conditions of hydrogenation. In addition, the present invention has made possible a process for producing rosin alcohols and other reduction products cheaply and in unlimited quantities from naturally occurring resins or simple derivatives thereof without the use of expensive chemical reagents.

The hydrogenated rosin products of this invention are useful in a number of applications where naturally occurring resins such as rosin are less satisfactory. Hydrogenation of abietic acid to the corresponding hydroabietic acids improves the light stability and makes the product more useful than the unhydrogenated materials for use in sizing paper and textiles. Hydroabietic acid esters may be employed as plasticizers and synthetic resin and varnish ingredients. Hydroabietyl alcohols are useful in the same applications and are particularly valuable components of glyptal resins and varnishes containing large proportions of China-wood oil.

As many apparently widely different embodiments of this invention may be made without departing from the spirit and scope thereof, it is to be understood that I do not limit myself to the specific embodiments thereof except as defined in the appended claims.

I claim:

1. The process which comprises catalytically hydrogenating an ester of abietic acid to the corresponding alcohol at a temperature between 200° and 400° C., under a hydrogen pressure in excess of 10 atmospheres, and in the presence of an alcohol-forming hydrogenation catalyst.

2. The process which comprises catalytically hydrogenating an ester of abietic acid to the corresponding alcohol at a temperature between 200° and 400° C., under a hydrogen pressure in excess of 10 atmospheres, and in the presence of a catalyst comprising essentially a chromite of a hydrogenating metal.

3. The process which comprises catalytically hydrogenating an ester of abietic acid to the corresponding alcohol at a temperature between 200° and 400° C., under a hydrogen pressure in excess of 10 atmospheres, and in the presence of a hydrogenation catalyst containing copper as an essential constituent.

4. The process which comprises catalytically hydrogenating an ester of abietic acid to the corresponding alcohol at a temperature between 200° and 400° C., under a hydrogen pressure in excess of 10 atmospheres, and in the presence of a catalyst comprising essentially copper chromite.

5. Process in accordance with claim 1, characterized in that the ester of abietic acid is ethyl abietate.

6. The process which comprises catalytically hydrogenating ethyl abietate at a temperature between 250° and 350° C., under a hydrogen pressure between 50 and 400 atmospheres, and in the presence of a copper chromite catalyst.

7. Process in accordance with claim 6, characterized in that the hydrogenated product obtained is further subjected to hydrogenation in the presence of a nickel catalyst, at a temperature of about 200° C., and under a pressure of about 1800 pounds per square inch, thereby completing the hydrogenation of the olefin bond and recovering the tetrahydroabietyl alcohol formed.

8. The process which comprises catalytically hydrogenating a hydroabietic compound selected from the class consisting of hydroabietic acid anhydrides and hydroabietic acid esters to the corresponding alcohol at a temperature between 250° and 350° C., under a hydrogen pressure between 50 and 400 atmospheres, and in the presence of a copper chromite catalyst.

9. The process which comprises catalytically hydrogenating abietic acid to hydroabietyl alcohol, at a temperature in excess of 200° C. and under a pressure in excess of 10 atmospheres, in the presence of nickel chromite.

10. The method of producing a resin alcohol which comprises hydrogenating an alkyl ester of abietic acid by treatment with hydrogen in the presence of a hydrogenation catalyst and under elevated temperature and pressure.

11. The method of producing a resin alcohol which comprises hydrogenating an alkyl ester of abietic acid by treatment with hydrogen in the presence of a hydrogenation catalyst and under a temperature above about 200° C. and a pressure of at least 100 atmospheres.

12. The process of producing an alcohol from a rosin compound of the class consisting of hydroabietic acid anhydrides and hydroabietic acid esters which comprises the step of catalytically hydrogenating said compound to the corresponding alcohol at a temperature between 200° and 400° C. under a hydrogen pressure between 50 and 400 atmospheres and in the presence of an alcohol-forming hydrogenation catalyst.

WILBUR A. LAZIER.

CERTIFICATE OF CORRECTION.

Patent No. 2,358,235.                                September 12, 1944.

WILBUR A. LAZIER.

It is hereby certified that error appears in the printed specification of the above numbered patent requiring correction as follows: Page 3, first column, line 64, for the words "hour hours" read --four hours--; page 5, second column, line 37, for the claim number "12" read --8--; and for the claims now appearing as "8", "9", "10" and "11" read --9--, --10--, --11-- and --12-- respectively; and that the said Letters Patent should be read with this correction therein that the same may conform to the record of the case in the Patent Office.

Signed and sealed this 26th day of December, A. D. 1944.

Leslie Frazer (Seal)                         Acting Commissioner of Patents.